United States Patent
Shang et al.

(10) Patent No.: US 9,242,873 B2
(45) Date of Patent: Jan. 26, 2016

(54) CO-DOPED TITANIUM OXIDE FOAM AND WATER DISINFECTION DEVICE

(75) Inventors: Jian-Ku Shang, Mahomet, IL (US); Pinggui Wu, Chicago, IL (US); Rong-Cai Xie, Anqing (CN)

(73) Assignee: The Board of Trustees of the University of Illinois, Urbana, IL (US)

( * ) Notice: Subject to any disclaimer, the term of this patent is extended or adjusted under 35 U.S.C. 154(b) by 1530 days.

(21) Appl. No.: 12/809,017

(22) PCT Filed: Dec. 18, 2008

(86) PCT No.: PCT/US2008/087523
§ 371 (c)(1),
(2), (4) Date: Sep. 9, 2011

(87) PCT Pub. No.: WO2009/086006
PCT Pub. Date: Jul. 9, 2009

(65) Prior Publication Data
US 2011/0311392 A1     Dec. 22, 2011

Related U.S. Application Data

(60) Provisional application No. 61/015,104, filed on Dec. 19, 2007.

(51) Int. Cl.
*A61L 2/235* (2006.01)
*B01J 27/24* (2006.01)
(Continued)

(52) U.S. Cl.
CPC ............... *C02F 1/30* (2013.01); *B01J 21/063* (2013.01); *B01J 23/10* (2013.01); *B01J 23/20* (2013.01); *B01J 23/28* (2013.01); *B01J 23/30* (2013.01); *B01J 23/34* (2013.01); *B01J 23/42* (2013.01); *B01J 23/44* (2013.01); *B01J 23/50* (2013.01); *B01J 23/72* (2013.01); *B01J 23/745* (2013.01); *B01J 23/75* (2013.01); *B01J 23/755* (2013.01); *B01J 27/24* (2013.01); *B01J 35/004* (2013.01); *B01J 35/04* (2013.01); *B01J 37/0018* (2013.01); *C04B 35/46* (2013.01); *C04B 38/00* (2013.01); *B01D 2255/20707* (2013.01); *B01D 2255/802* (2013.01); *C02F 2305/10* (2013.01); *C04B 2111/00793* (2013.01); *Y02W 10/37* (2015.05)

(58) Field of Classification Search
None
See application file for complete search history.

(56) References Cited

U.S. PATENT DOCUMENTS

| | | | | |
|---|---|---|---|---|
| 3,950,460 | A | * | 4/1976 | Mastrangelo et al. .......... 264/44 |
| 2004/0067193 | A1 | * | 4/2004 | Sakatani et al. .............. 423/608 |

(Continued)

FOREIGN PATENT DOCUMENTS

JP     2006/104047     *     4/2006

OTHER PUBLICATIONS

Preparation of Titania Foams Having an Open Cellular Structure an Their Application to Photocatalysis. Akinori Yamamoto et al. (journal of catalysis 226 (2004). 462-465.*

(Continued)

*Primary Examiner* — Melvin C Mayes
*Assistant Examiner* — Colette Nguyen
(74) *Attorney, Agent, or Firm* — Brinks Gilson & Lione

(57) ABSTRACT

A quaternary oxide foam, comprises an open-cell foam containing (a) a dopant metal, (b) a dopant nonmetal, (c) titanium, and (d) oxygen. The foam has the advantages of a high surface area and a low back pressure during dynamic flow applications. The inactivation of *Escherichia coli* (*E. coli*) was demonstrated in a simple photoreactor.

14 Claims, 7 Drawing Sheets

(51) Int. Cl.

| | | |
|---|---|---|
| *C02F 1/30* | (2006.01) | |
| *B01J 21/06* | (2006.01) | |
| *B01J 23/10* | (2006.01) | |
| *B01J 23/20* | (2006.01) | |
| *B01J 23/28* | (2006.01) | |
| *B01J 23/30* | (2006.01) | |
| *B01J 23/34* | (2006.01) | |
| *B01J 23/42* | (2006.01) | |
| *B01J 23/44* | (2006.01) | |
| *B01J 23/50* | (2006.01) | |
| *B01J 23/72* | (2006.01) | |
| *B01J 23/745* | (2006.01) | |
| *B01J 23/75* | (2006.01) | |
| *B01J 23/755* | (2006.01) | |
| *B01J 35/00* | (2006.01) | |
| *B01J 35/04* | (2006.01) | |
| *B01J 37/00* | (2006.01) | |
| *C04B 35/46* | (2006.01) | |
| *C04B 38/00* | (2006.01) | |
| *C04B 111/00* | (2006.01) | |

(56) References Cited

U.S. PATENT DOCUMENTS

| | | | |
|---|---|---|---|
| 2007/0190765 A1 | 8/2007 | Xie et al. | 438/585 |
| 2007/0202334 A1* | 8/2007 | Xie et al. | 428/402 |

OTHER PUBLICATIONS

Photocatalytic Decomposition of Acetaldehyde Under Visible Light Irradiation Over La3+ and N co-doped TiO2. Yoshiaki Sakatani et al. (Chemistry Letters vol. 32, No. 12 (2003).*

Metal Ion and N co-doed TiO2 as a visible-light photocatalyst. Sakatani et al. J. Mater. Res. vol. 19, No. 7, Jul. 2004.*

Belháčová, Lenka et al., "Inactivation of Microorganisms in a Flow-Through Photoreactor with an Immobilized $TiO_2$ Layer," *J. Chem Technol Biotechnol* 74, (1999) pp. 149-154.

Belver, Carolina et al., "Palladium Enhanced Resistance to Deactivation of Titanium Dioxide During the Photocatalytic Oxidation of Toluene Vapors," *Applied Catalysis B: Environmental* 46 (2003) pp. 497-509.

Cheng, Ping et al., "Recent Progress in Titania Photocatalyst Operating Under Visible Light," *Progress in Chemistry* 17, 1 (2005) pp. 8-14. (Abstract Only).

Choi, Yong-Suk et al., "Photocatalytic Disinfection of *E. coli* in a $UV/TiO_2$-Immobilised Optical-Fibre Reactor," *J. Chem Technol Biotechnol* 75, (2000) pp. 1145-1150.

Fuerte, A. et al., "Visible Light-Activated Nanosized Doped-$TiO_2$ Photocatalylsts," *Chem. Commun.* (2001) pp. 2718-2719.

Gracia, F. et al., "Structural, Optical, and Photoelectrochemical Properties of $M^{n+}$-$TiO_2$ Model Thin Film Photocatalysts," *J. Phys. Chem B*, 108 (2004) pp. 17466-17476.

Huang, Wenya et al., "Progress of Semiconductor Photocatalysts Under Visible Light Irradiation," *Progress in Chemistry* 17, 2 (2005) pp. 242-247. (Abstract Only).

Iwasaki, Mitsunobu et al., "Cobalt Ion-Doped $TiO_2$ Photocatalyst Response to Visible Light," *Journal of Colloid and Interface Science* 224 (2000) pp. 202-204.

Langlet, M. et al., "Sol-Gel Preparation of Photocatalytic $TiO_2$ Films on Polymer Substrates," *Journal of Sol-Gel Science and Technology* 25 (2002) pp. 223-234.

Li, W. et al., "Band Gap Tailoring of $Nd^{3+}$-Doped $TiO_2$ Nanoparticles," *Applied Physics Letters* 83, 20 (2003) pp. 4143-4145.

Li, Laisheng et al., "Photocatalytic Oxidation and Ozonation of Catechol Over Carbon-Black-Modified Nano-$TiO_2$ Thin Films Supported on Al Sheet," *Water Research* 37 (2003) pp. 3646-3651.

Lin, Li et al., "Phosphor-Doped Titania—a Novel Photocatalyst Active in Visible Light," *Chemistry Letters* 34, 3 (2005) pp. 284-285.

Litter, Marta I., "Heterogeneous Photocatalysis Transition Metal Ions in Photocatalytic Systems," *Applied Catalysis B: Environmental* 23 (1999) pp. 89-114.

Matsunaga, Tadashi et al., "Photoelectrochemical Sterilization of Microbial Cells by Semiconductor Powders," *FEMS Microbiology Letters* 29 (1985) pp. 211-214.

Mi-Jin, Yu et al., "Photocatalytic Cell Disruption of *Giardia lamblia* in a $UV/TiO_2$ Immobilized Optical-Fiber Reactor," *J. Microbiol. Biotechnol.* 14(6) (2004) pp. 1105-1113.

Ohno, Teruhisa et al., "Preparation of S-Doped $TiO_2$ Photocatalysts and Their Photocatalytic Activities Under Visible Light," *Applied Catalysis A: General* 265 (2004) pp. 115-121.

Rampaul, Ashti et al., "Titania and Tungsten Doped Titania Thin Films on Glass; Active Photocatalysts," *Polyhedron* 22 (2003) pp. 35-44.

Reddy, Ettireddy P., "Transition Metal Modified $TiO_2$-Loaded MCM-41 Catalysts for Visible-and UV-Light Driven Photodegradation of Aqueous Organic Pollutants," *J. Phys. Chem. B* 108 (2004) pp. 17198-17205.

Ruiz, A. et al., "Study of the Influence of Nb Content and Sintering Temperature on $TiO_2$ Sensing Films," *Thin Solid Films* 436 (2003) pp. 90-94.

Sakatani, Yoshiaki et al., "Metal Ion and N Co-Doped $TiO_2$ as a Visible-Light Photocatalyst," *J. Mater. Res.*, 19, 7 (2004) pp. 2100-2108.

Sakatani, Yoshiaki et al., "Photocatalytic Decomposition of Acetaldehyde Under Visible Light Irradiation over $La^{3+}$ and N Co-Doped $TiO_2$," *Chemistry Letters* 32, 12 (2003) pp. 1156-1157.

Selcuk, H. et al., "Photocatalytic and Photoelectrocatalytic Performance of 1% Pt Doped $TiO_2$ for the Detoxification of Water," *Journal of Applied Electrochemistry* 34 (2004) pp. 653-658.

Shchukin, Dmitry G., "Heterogeneous Photocatalysis in Titania-Containing Liquid Foam," *Photochem. Photobiol. Sci.*, 3 (2004) pp. 157-159.

Sökmen, Münevver et al., "Disinfection of *E. coli* By the Ag—$TiO_2$/UV System: Lipidperoxidation," *Journal of Photochemistry and Photobiology A: Chemistry* 143 (2001) pp. 241-244.

Sunada, Kayano et al., "Bactericidal Activity of Copper-Deposited $TiO_2$ Thin Film Under Weak UV Light Illumination," *Environ. Sci. Technol.* 37 (2003) pp. 4785-4789.

Tatsuma, Tetsu et al., "Bactericidal Effect of an Energy Storage $TiO_2$—$WO_3$ Photocatalyst in Dark," *Electrochemistry Communications* 5 (2003) pp. 793-796.

Wu, P.-G. et al., "Effects of Nitrogen Doping on Optical Properties of $TiO_2$ Thin Films," *Appl. Phys. A* 81 (2005) pp. 1411-1417.

Yan, Xiaoli et al., "Preparation, Characterization and Photocatalytic Activity of Si-Doped and Rare Earth-Doped $TiO_2$ from Mesoporous Precursors," *Applied Catalysis B: Environmental* 55 (2005) pp. 243-252.

Yu, Jimmy C. et al., "Efficient Visible-Light-Induced Photocatalytic Disinfection on Sulfur-Doped Nanocrystalline Titania," *Environ. Sci. Technol.* 39 (2005) pp. 1175-1179.

\* cited by examiner

CO-DOPED TITANIUM OXIDE FOAM AND WATER DISINFECTION DEVICE

CROSS REFERENCE TO RELATED APPLICATION

This application claims the benefit of U.S. Provisional Application No. 61/015,104 filed 19 Dec. 2007, the contents of which are hereby incorporated by reference, except where inconsistent with the present application.

FEDERALLY SPONSORED RESEARCH OR DEVELOPMENT

This application was funded in part under the following research grants and contracts: National Science Foundation, Agreement Number CTS-0120978, and U.S. Department of Energy grant DEFG02-91-ER45439. The U.S. Government may have rights in this invention.

BACKGROUND

Heterogeneous photocatalysis has attracted great interest for the degradation of toxic organic and inorganic species, inactivation of pathogenic microorganisms, and odor removal from contaminated environments. Photocatalysts currently used are mostly in the form of aqueous $TiO_2$ slurries or suspensions. Some of the problems with $TiO_2$ suspensions are the need for ultraviolet (UV) irradiation to activate the photocatalyst, and difficulty recycling the dispersed photocatalyst. To eliminate the requirement for UV irradiation, a few research groups have reported using visible light to induce photocatalysis of metal or nonmetal element doped $TiO_2$ (1-7). Metal and nonmetal element co-doped $TiO_2$ often exhibits improved photocatalytic activity compared to single element doped $TiO_2$, under visible light irradiation (8-10, 31, 32).

For easy recycling of photocatalysts, a variety of systems using immobilized titania on metallic or nonmetallic supports (11), glass (12), polymer substrate (13) and activated carbon fibers (10) have been proposed. For application on an industrial scale, the immobilized photocatalyst faces a new problem: the reaction efficiency is often restricted by the limited contact area of the immobilized photocatalyst. A few efficient dynamic photoreactors have been reported for UV irradiated $TiO_2$ systems which may be the useful for studying visible light activated photocatalysts (14, 15). Choi and Kim conducted photocatalytic disinfection in a plug-flow type photo-bioreactor using optical fibers inserted in glass tubes (16). The optical fibers were used to diffuse the UV light uniformly within the reactor. Shchukin et al. studied heterogeneous photocatalysis in a titania-containing liquid (17).

SUMMARY

In a first aspect, the present invention is a quaternary oxide foam, in monolithic form, comprising an open-cell foam. The open-cell foam contains (a) a dopant metal, (b) a dopant nonmetal, (c) titanium, and (d) oxygen.

In a second aspect, the present invention is a method of making a quaternary oxide foam, comprising impregnating an open-cell template foam with a liquid mixture; and heating the impregnated open-cell foam, to form the quaternary oxide foam. The liquid mixture contains (a) a dopant metal, (b) a dopant nonmetal, and (c) titanium.

In a third aspect, the present invention is a method of catalyzing a reaction, comprising exposing a quaternary oxide foam to light; and contacting the quaternary oxide foam with a reactant, to form a product of the reaction. The quaternary oxide foam comprises an open-cell foam containing (a) a dopant metal, (b) a dopant nonmetal, (c) titanium, and (d) oxygen.

In a fourth aspect, the present invention is a reactor, comprising (i) an inlet, (ii) an outlet, and (iii) a catalyst, fluidly connected to the inlet and the outlet. The catalyst comprises a quaternary oxide foam comprising an open-cell foam containing (a) a dopant metal, (b) a dopant nonmetal, (c) titanium, and (d) oxygen.

In a fifth aspect, the present invention is a quaternary oxide foam, prepared by a method comprising impregnating an open-cell template foam with a liquid mixture; and heating the impregnated open-cell foam, to form the quaternary oxide foam. The liquid mixture contains (a) a dopant metal, (b) a dopant nonmetal, and (c) titanium.

DEFINITIONS

The following definitions are included to provide a clear and consistent understanding of the specification and claims.

The term "quaternary oxide" means a substance containing oxygen and at least three other elements.

The term "titanium source" means a substance containing titanium and from 1 to 4 labile ligands.

The term "polar organic solvent" means a non-aqueous solvent having a dielectric constant at 25° C. of at least 10.

The term "dopant nonmetal source" means a substance containing a nonmetal element that is not oxygen, and optionally containing other elements. For example, a dopant nonmetal source may contain boron, carbon, nitrogen, fluorine, silicon, phosphorus, sulfur, chlorine, germanium, arsenic, selenium, bromine, antimony, tellurium, iodine and/or astatine.

The term "dopant metal source" means a substance containing a metal that is not titanium, and that can provide a source of ions of the metal, where the metal ion is an ion of an element having an atomic number of 13, 20, 21, from 23 to 31, from 38 to 50, or from 56 to 83. Dopant metal sources include, for example, salts of the metal and oxides of the metal.

The term "calcination" means heating a substance at a temperature below its melting point.

The term "photocatalysis" means a catalysis that is dependent on the presence of electromagnetic radiation to catalyze a reaction.

The term "visible light" means electromagnetic radiation having a wavelength from 380 nm to 780 nm.

BRIEF DESCRIPTION OF THE DRAWINGS

FIG. 8 (b) is a graph of pore size distribution obtained by the BJH method.

DETAILED DESCRIPTION

Figure 1:
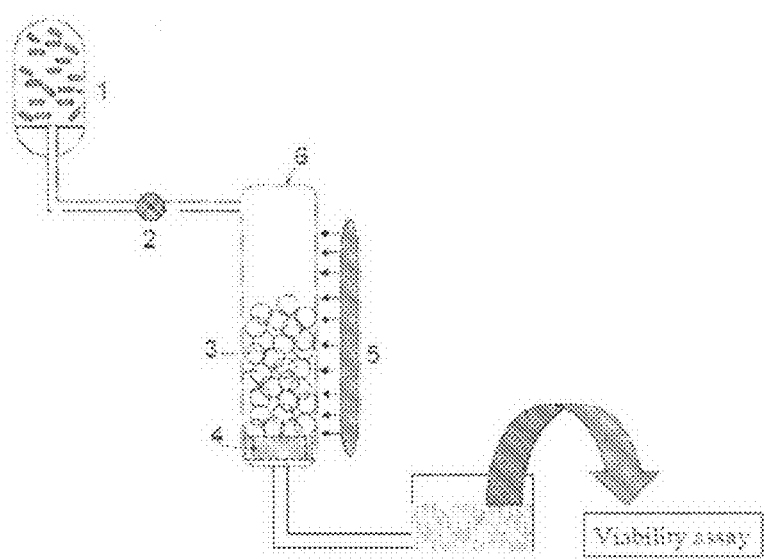
FIG. 1 is a schematic of purifier, the experimental set-up used for photocatalytic measurements in the foam, showing contaminated water, 1; an inlet (here, a valve), 2; catalyst (here, metal doped TiON foam), 3; an outlet (here, a glass fiber stopper), 4; a light source (here, a 2×30 watt fluorescent lamp), 5; and a housing (here, a glass tube), 6.

The present invention is based on the discovery of open-cell foams of quarternary titanium oxide containing a non-metal, preferably nitrogen, and metal (for example, metal doped TiON). Foam has the advantages of a high surface area and a low back pressure during dynamic flow applications. The inactivation of Escherichia coli (E. coli) was demonstrated in a simple photoreactor.

The foams are made by templated growth of quarternary titanium oxide in the pores of a foam template, preferably followed by removal of the foam. Metal doped TiON foams demonstrated photocatalytic inactivation of E. coli under visible light irradiation. Since the form of this novel photocatalyst requires no recovery of photocatalyst particles, and metal doped TiON can be efficiently activated by visible light or sun light, these visible-light activated photocatalyst present great promise for providing antimicrobial treatment as an alternative to traditional chlorination for water disinfection. Furthermore, the foam structure of the quarternary titanium oxide of the present invention provide a superior form for catalyst applications: Ag doped TiON foam has been found to deactivate the E. coli in a sample of water with a residence time of only 20 seconds, while other forms of Ag doped TiON examined required minutes.

The oxide foam is an open-cell foam. Preferably, the foam has at least two peaks in the pore size distribution. Preferably, a first peak in the pore size distribution corresponds with pores having a size of 0.1 to 10 mm, and a second peak in the pore size distribution corresponds with pores having a size of 2 to 50 nm. Preferably, the foam has a porosity of at least 90%, including 91, 92, 93, 94, 95 and 96% porosity. Preferably, the foam is monolithic, or contains monolithic pieces have a longest dimension of at least 0.1 mm, more preferably at least 0.5 mm, including 1, 2, 3, 4, 5, 6, 7, 8, 9 and 10 mm. Preferably, visible light will loose no more than 75% of its intensity when it passes through 1 cm of the foam, more preferably visible light will loose less than 60% of its intensity when it passes through 1 cm of the foam, and most preferably visible light will loose less than 50% of its intensity when it passes through 1 cm of the foam.

A method of making a quaternary oxide includes heating or calcining an impregnated foam, preferably organic foam, impregnated with a mixture of substances containing titanium, oxygen, a dopant nonmetal and a dopant metal. Other substances or elements may be present in the mixture, such as halides, hydrogen, etc., provided that they volatilize or phase separate from the mixture during heating. The titanium may be present in the mixture as an oxide, a sulfide, a halide, an alkoxide, a nitrate, and/or an oxysulfate. The oxygen may be present in the mixture as part of a compound with titanium, such as a titanium oxide, a titanium alkoxide, and/or a titanium oxysulfate. The dopant nonmetal may be present in the mixture as a hydrogen compound such as ammonia or an ammonium salt, ammonium bifluoride, a borohydride, or hydrogen sulfide. The dopant nonmetal may be present in the mixture as a metal compound such as a metal nitride, a metal sulfide, or a metal oxide. The dopant nonmetal may be present in the mixture as a component of a salt such as a sulfate or a carbonate. The dopant nonmetal may be present in the mixture as an organic compound, such as an amine, an alcohol, a carboxylic acid, an aldehyde, a ketone, a sulfone, a sulfoxide, or a fluorocarbon. The dopant metal may be present in the mixture as an oxide, a sulfide, a halide, an alkoxide, a nitrate, or an oxysulfate.

An example of a method of making a quaternary oxide includes combining ingredients including a titanium source, a dopant nonmetal source, a dopant metal source, and a polar organic solvent to form a reaction mixture; impregnating the mixture into a foam template; and heating or calcining the reaction mixture. Another example of making a quaternary oxide is by a procedure that includes mixing a titanium source and a dopant nonmetal source with a polar organic solvent to form a first mixture, adding a dopant metal source and water to the first mixture to form a reaction mixture, impregnating the mixture into a foam template, heating the reaction mixture, and calcining the mixture.

Combining ingredients may include mixing the ingredients in any order. Combining ingredients also may include adding other ingredients to form the reaction mixture. A quaternary oxide formed may contain a dopant metal, a dopant nonmetal, titanium and oxygen.

The mixture of combined ingredients includes a polar organic solvent, and is in liquid form, so that it can be impregnated into a foam. The foam acts as a sponge, drawing the liquid mixture into its pores. Preferably, the foam is an organic foam, which will burn off or decompose during heating or cancination. Examples included natural sponges, tofu, cellulose foams and sponges, and foams made from polymers, such as polyesters, polyolefins such as polyethylene, polyurethans, polyimides, melamine, as well as proteins and polysaccharides. The foam has an open-cell structure.

Heating or calcining the reaction mixture may include heating the reaction mixture at a temperature of from 50° C. to 700° C. for at a period of at least 4 hours. Preferably, the final temperature of the heating or calcining is at least 300° C., such as 300° C. to 800° C., including 340° C., 400° C., 500° C., 600° C. and 700° C. Preferably, the heating or calcining is carried out for an amount of time sufficient to form photocatalytically active quarternary titanium oxide, more preferably having an anatase structure (i.e. forming an anatase phase), and most preferably to remove or burn off most or all of the foam template.

The titanium source may be any titanium compound or complex, including an oxide, a sulfide, a halide, an alkoxide, a nitrate, and an oxysulfate. Preferably the titanium source is a titanium(IV) halide, a titanium(IV) alkoxide, a titanium(IV) nitrate or a titanium(IV) oxysulfate. More preferably the titanium source is a titanium(IV) alkoxide.

The dopant nonmetal source may be a hydrogen compound, a metal compound, a component of a salt, or an organic compound. Preferably the dopant nonmetal source includes boron, carbon, nitrogen, sulfur, fluorine, or a combination of these elements. More preferably the dopant nonmetal source includes nitrogen.

The dopant metal source may be an oxide, a sulfide, a halide, an alkoxide, a nitrate, or an oxysulfate. Preferably the dopant metal source contains an ion of tungsten, neodymium, iron, molybdenum, niobium, manganese, cerium, calcium, cobalt, nickel, copper, gallium, strontium, yttrium, zirconium, palladium, silver, tin, lanthanum or platinum.

The polar organic solvent may be any non-aqueous solvent having a dielectric constant at 25° C. of at least 10. More preferably the polar organic solvent has a dielectric constant at 25° C. of at least 25. Examples of polar organic solvents include ethylene glycol, and alcohols such as ethanol and methanol.

Other ingredients may include water, a surfactant, and/or a surface-directing agent. One or more of these other ingredients may be combined with the titanium source, dopant nonmetal source, and dopant metal source to form the reaction mixture. One or more of these other ingredients may be combined with one or two of the titanium source, the dopant nonmetal source and dopant metal source, and then combined with the remaining ingredient or ingredients to form the reaction mixture. One or more of these other ingredients may be added to the reaction mixture just prior to heating the reaction mixture.

A quaternary oxide containing a dopant metal, a dopant nonmetal, titanium and oxygen may be characterized in terms of its elemental composition. The atomic ratio of titanium to oxygen to dopant nonmetal (Ti:O:A) may be 1:0.5-1.99:0.01-1.5. Preferably the Ti:O:A atomic ratio is 1:1.0-1.99:0.01-1.0; more preferably is 1:1.5-1.99:0.01-0.5, and more preferably is 1:1.9-1.99:0.01-0.1. Preferably the dopant nonmetal is boron, carbon, nitrogen, sulfur or fluorine. More preferably the dopant nonmetal is nitrogen.

The quaternary oxide may contain the dopant metal at a concentration of at most 10 percent by weight (wt %). Preferably the quaternary oxide contains the dopant metal at a concentration of at most 5 wt %, more preferably at a concentration of at most 2 wt %. Preferably the dopant metal is tungsten, neodymium, iron, molybdenum, niobium, manganese, cerium, calcium, cobalt, nickel, copper, gallium, strontium, yttrium, zirconium, palladium, silver, tin, lanthanum or platinum.

In addition to the elemental composition, the quaternary oxide may be characterized by a number of other properties. The crystal structure of the quaternary oxide may be characterized by X-ray diffraction, electron diffraction, neutron diffraction, electron microscopy, examination of physical and chemical properties, and/or by other well known methods. Preferably the quaternary oxide is in the anatase structure type (anatase phase). The band gap of the quaternary oxide may be characterized by spectroscopic analysis. The energy of absorbed radiation having the longest wavelength corresponds to the band gap energy. Preferably the quaternary oxide has a band gap less than 3.0 electron-volts (eV).

A catalytic composition may include the quaternary oxide containing a dopant metal, a dopant nonmetal, titanium and oxygen, where the atomic ratio of titanium to oxygen to dopant nonmetal (Ti:O:A) is 1:0.5-1.99:0.01-1.5. The catalytic composition may be characterized by the rate of conversion of a chemical reaction when the reactants of the reaction are in contact with the composition. When an organic substance is in contact with the composition and is irradiated with visible light, the concentration of the organic substance may be reduced by 40% within 4 hours.

The mixture may include other ingredients, such as a surfactant, a coupling agent or a pH buffer. Examples of other mixture ingredients include aluminum phosphate ($AlPO_4$), silane compounds such as 3-glycidoxypropyltrimethoxysilane, and fluoroalkyl-silane compounds such as (tridecafluoro-1,1,2,2-tetrahydrooctyl)-trichlorosilane.

Quaternary oxides can be used in a variety of applications. Examples of possible applications include catalysis, water and air purification, gas sensing, hydrogen production, solar energy production, fiber lasers, additives for composites and fabrics, and cancer therapy. In general, any application that can utilize titanium oxide, titanium oxide doped with a metal, and/or titanium oxide doped with a nonmetal may also utilize a quaternary oxide. One advantage of quaternary oxides over these conventional materials is the high catalytic efficiency of quaternary oxides under visible light rather than UV light. Thus, applications of the conventional materials that require UV irradiation may be performed under visible light using a quaternary oxide.

Catalytic compositions including a quaternary oxide may be used to facilitate a wide variety of reactions. For example, a catalytic composition may be mixed with a reactant fluid and irradiated with visible light, providing for a chemical reaction of one or more ingredients of the fluid. The catalytic composition may then be recovered from the fluid and recycled for use in another portion of reactant fluid. Depending on the application and the composition of the dopants in the quaternary oxide, catalytic compositions containing a quaternary oxide may be used in place of general metal catalysts such as cobalt, nickel, copper, gold, iridium, lanthanum, nickel, osmium, platinum, palladium, rhodium, ruthenium, silver, strontium, yttrium, zirconium and tin.

A reactor, such as a purifier for purification or disinfection of air or water, is illustrated in FIG. 1. Shown are an inlet, 2, an outlet, 4, and catalyst (quarternary titanium oxide), 3. Optionally, the reactor may also include a light source, 5, and a housing, 6. During operation, reactants (such a water or air for purification) enter the inlet, travel over and/or through the catalyst, and exit through the outlet. A light source, for activating the catalyst, may optionally be included, or the light could come from sun light or ambient visible light. A housing, for supporting the inlet, the outlet, and/or the catalyst, may also optionally be included in the reactor.

EXAMPLES

Synthesis.

A cube of 1.0 g polyethylene cushion foam was used as the template in synthesis. Typical procedure of synthesis is as follows. Reagent grade titanium tetraisopropoxide (TTIP 98+%), tetramethylammonium hydroxide (TMA, 25% in methanol), and ethyl alcohol were purchased from Aldrich and used as received without further purification. A mixture of TTIP and TMA (mol ratio 4:1) was first made as the precursor for nitrogen-doped titanium dioxide (TiON). The addition of a metal precursor (30 mg or otherwise stated) dissolved in 2 mL dimethyl chloride leads to the formation of a suspension of metal doped TiON. The template cube was then placed in the suspension. The foam template quickly and completely absorbed all the suspension into its pores, and was left to gel in a fume hood in air for 24 h. Following calcination at 500° C. in air at a constant slow heating rate for 4 h, fine crystallites of metal doped TiON were inter-connected to each other and finally formed a metal doped TiON foam material after the removal of polyethylene template during the calcination.

Metal precursors as listed in Table 1 were all purchased from Sigma-Aldrich and the metal doped TiON foam was prepared in a similar process.

TABLE 1

List of precursors and performances of the metal co-doped photocatalysts.

| Samples | Metal dopant | Metal precursor | E. coli survival (%) | Ref. |
|---|---|---|---|---|
| $M_1$ | Cu | Copper acetylacetonate | 28.8 | (20) |
| $M_2$ | W | Ammonium tungstate | 56 | (21, 22) |
| $M_3$ | Pt | Platinum(II) acetylacetonate | 20 | (23, 24) |
| $M_4$ | Nd | Neodymium(III) acetate hydrate | 14.8 | (25, 26) |
| $M_5$ | Fe | Iron(III) nitrate nonahydrate | 33 | (22) |
| $M_6$ | Co | Cobalt(II) acetylacetonate | 66 | (27) |
| $M_7$ | Mo | Molybdenum(V) chloride | 68 | (22) |
| $M_8$ | Nb | Niobium(V) chloride | 67 | (22, 28) |
| $M_9$ | Mn | Manganese(III) acetylacetonate | 62 | (22) |
| $M_{10}$ | Ag | Silver acetate | 0.1 | (29) |
| $M_{11}$ | Y | Yttrium(III) acetylacetonate hydrate | 35.5 | (26) |
| $M_{12}$ | Pd | Palladium acetylacetonate | 30 | (30) |
| $M_{13}$ | Ce | Cerium(III) chloride heptahydrate | 55 | (22) |
| $M_{14}$ | Ni | Nickel(II) acetate tetrahydrate | 80 | (22) |

TGA.

The thermal property of the polyethylene foam template was measured by thermogravimetric analysis (TGA) using a Hi-Res TA Instruments 2950 thermogravimetric analyzer in air. The sample was first heated at 110° C. for 60 min to remove the water and then heated at 10° C./min to 700° C.

XRD.

Structure of the Pd doped TiON foams were characterized by X-ray diffraction (XRD) measurements on a Rigaku RAX-10 X-ray diffractometer, using Cu Kα radiation (45 kV, 20 mA).

XPS.

Samples were characterized by X-ray photoelectron spectroscopy (XPS). Measurements were performed with a Physical Electronics PHI 5400 X-ray photoelectron spectrometer (Perkin-Elmer) with an Mg Kα anode (15 kV, 400 W) at a take-off angle of 45°. Multiplex XPS spectra of N 1s, O 1s, Pd 3d, and Ti 2p were recorded using band-pass energy of 35.75 eV corresponding to an energy resolution of 1.2 eV.

Microscopy.

Foams were observed with a Zeiss 62293 optical microscope using the transmitted beam. The foams' surface morphology was examined by a scanning electron microscope Hitachi S-4700 (Hitachi, Tokyo, Japan) at an acceleration voltage of 5-15 kV.

BET.

The analysis of surface area and pore size distribution was carried out with an Autosorb-1 apparatus (Quantachrome). Samples were outgassed at 200° C. Nitrogen isotherm results at 77 K in the appropriate relative pressure ranges were used for subsequent calculations. Specific surface area of the sample was determined using the standard BET equation. The pore size distribution was calculated from the desorption branch of $N_2$ adsorption-desorption isotherm using the conventional Barrett-Joyner-Halenda (BJH) method. The analysis of the data was completed using the built-in computer program supplied with the apparatus.

Bacterial Culture.

Wild type *Escherichia coli* AN 387 was provided by Prof. J. Imlay at the Department of Microbiology, University of Illinois. Bacteria cells were inoculated each time from an agar plate into a 4 mL liquid Luria-Bertani (LB) medium. The cells were grown aerobically in the medium placed on a rotary shaker at 37° C. for 18 h. Cells were harvested from overnight culture by centrifugation for 5 min at 277 K and 6000 rpm, washed twice using a phosphate buffer solution (0.05 M $KH_2PO_4$ and 0.05 M $K_2HPO_4$, pH 7.0), then resuspended and diluted in stock buffer solution prior to use for sterilizing experiments. The initial cell concentration was in the magnitude of $10^5$ colony forming unit (cfu)/mL, determined by a viable count procedure on agar plates after serial dilutions. All solid or liquid materials were autoclaved for 30 min at 121° C. before use.

Photocatalytic Inactivation

The experimental set-up used for a dynamic bactericidal testing is shown schematically in FIG. 1. At starting time, an aliquot of 1 L bacteria suspension was placed in a sterile container. The amount of photocatalyst applied in each test was approximately 1.0 g, about 2 to 3 inches in flow-through length when inserted into a glass tube. At the end of the tube, a glass fiber stopper was used to retain the foam in the glass tube. The glass tube was illuminated by two 30 W fluorescent lamps. Flow rate was adjusted to 20-50 mL/min with a valve, and the collected cell aliquots were withdrawn for cell viability assays. Analyses were carried out in duplicate and control runs were carried out under the same illumination condition with photocatalyst wrapped in the dark.

Cell Viability Assay.

After appropriate dilutions in buffer solution, aliquots of 20 µL cell culture together with 2.5 mL top agar was spread onto an agar medium plate and incubated at 37° C. for 24 h. The number of viable cells in terms of colony-forming units was counted.

Figure 2:
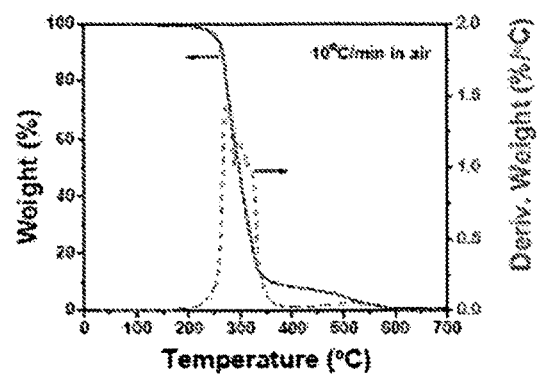
FIG. 2 is a graph prepared from a thermal gravimetric analysis of polyethylene foam.

As the TGA result indicated in FIG. 2, removal of the templates upon calcination is clear. A weight loss in the temperature range between 250 and 550° C. is observed. Since the physisorbed water has been removed during pre-heating at 110° C., the observed weight loss is attributed to the removal of templates. The polyethylene template has its greatest weight loss in the temperature range between 250 and 340° C., followed by a small weight-loss tail. If calcination is carried out at a temperature>340° C., the majority of the template is burnt away. At the calcination temperature of 500° C., for example, nearly 95% of the template can be removed during calcination.

Figure 3:
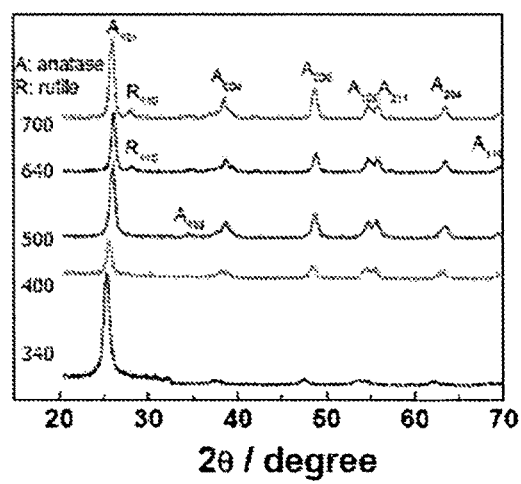
FIG. 3 shows the X-ray diffraction patterns of the Pd doped TiON foam after calcination at 340° C., 400° C., 500° C., 640° C. and 700° C., respectively.

FIG. 3 shows the X-ray diffraction pattern of a Pd doped TiON foam when the calcination temperature varied in the range between 340 and 700° C. It can be seen that all metal doped TiON foams exhibit a dominating anatase-$TiO_2$ phase. However, rutile phase started to be seen when calcination temperature>=640° C. It also shows with the weak peaks of A(004), A(200), A(105), A(211) and A(204) that the calcination temperature of 340° C. is not high enough to ensure good crystallinity. The best crystalline quality of pure anatase phase was achieved with a calcination temperature of about 400° C.

Figure 4:
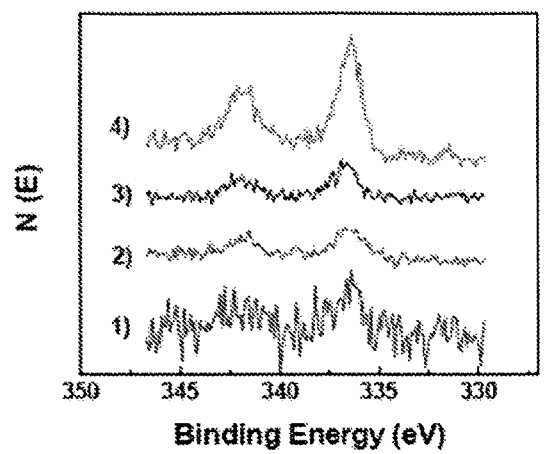
FIG. 4 shows XPS multiplex high resolution scans over the Pd 3d spectral regions. Increase in band intensity of Pd 3d was observed with higher Pd precursor amounts added, where 1) is 10 mg, 2) is 20 mg, 3) is 30 mg, and 4) is 90 mg.
Figure 5:
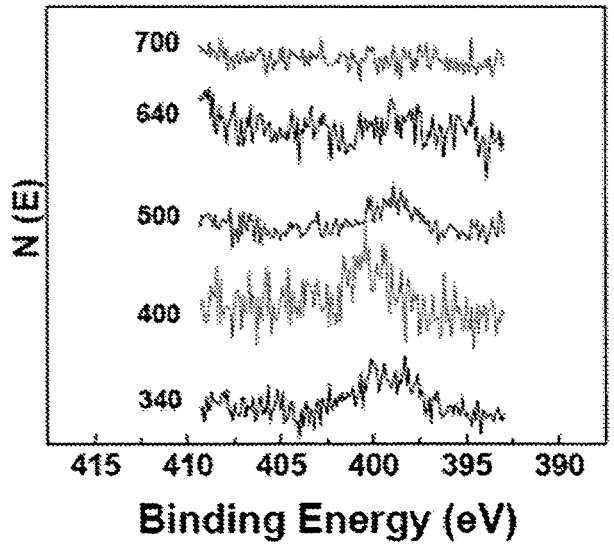
FIG. 5 shows XPS multiplex high resolution scans over the N 1s spectral regions. Decrease in band intensity of N 1s was observed with higher calcination temperatures over the range of 340 to 700° C.

XPS survey spectra of the representative Pd doped TiON foam (data not shown) demonstrated the existence of N, O, Pd and Ti in the foams. Multiplex high resolution scans over the $N_{1s}$ and $Pd_{3d}$ spectral regions are included in FIGS. 4 and 5. The spectrum of $Pd_{3d}$ is shown in FIG. 4. The peak around 336.8 eV is assigned to $Pd_{3d,5/2}$ in PdO form, which means the Pd is oxidized. An increase in band intensity of $Pd_{3d}$ was observed with higher Pd precursor added in the range between 10 to 90 mg. A semi-quantitative analysis of the surface composition was estimated by taking the average intensity ratio from multiplex scans of $N_{1s}$, $O_{1s}$, $Ti_{2p}$ and $Pd_{3d}$ using the method adopted previously (6). The concentration of Pd as PdO determined by XPS is listed in Table 2, which is consistently a little lower than the theoretical values. Theoretical values were obtained under the assumption that the added Pd totally remains in the final product without weight loss. A substantial decrease in band intensity of $N_{1s}$ is observed associated with higher calcination temperature in the range from 340 to 700° C., as shown in FIG. 5. The appearance of an $N_{1s}$ band at 399-400 eV indicated that nitrogen was incorporated and remained in the foam after calcination at 340, 400 and 500° C. The $N_{1s}$ peak was barely visible after calcination at 640 and 700° C., indicating that nitrogen as-doped during synthesis was replaced by the oxygen in air through high temperature oxidation. The concentration of nitrogen after calcination was also determined and listed in Table 3. At 640 and 700° C., the concentration of N was too low to be reasonably measured with XPS technique.

TABLE 2

Characteristics of Pd doped TiON foams

| Pd precursor amount (mg) | Theoretical wt. % | Es. wt. % from XPS measurement |
|---|---|---|
| 10 | 0.31 | 0.2 |
| 20 | 0.64 | 0.5 |
| 30 | 0.95 | 0.6 |
| 90 | 2.8 | 1.8 |

TABLE 3

Nitrogen concentrations in Pd doped TiON after calcination

| Calcination Temp. (° C.) | N % from XPS measurement |
|---|---|
| 340 | 2.8 |
| 400 | 1.9 |
| 500 | 1.2 |
| 640 | N/A |
| 700 | N/A |

Figure 6:
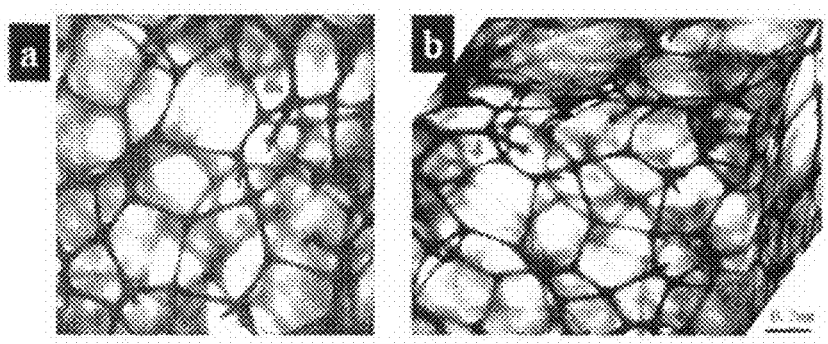
FIGS. 6 (a) and (b) are optical microscope images showing the macropores of the porous foams: (a) image of the open cells; (b) schematic 3-D view of the open cells.

The morphology of the foam was observed by optical and electron microscopy. The free-form art in FIG. 6a is the open-cell foam observed with a light microscope. FIG. 6b is a 3-D view of the foam. It formed an open network of large pores of hundreds of micrometers in diameter. Since the pore dimension is larger than the size of bacteria (normally 1-2 μm), these large pores are desirable both for improving the contact efficiency between the bacteria and the photocatalyst, and for reducing the pressure drop across the foam in a dynamic reactor. The pores may also increase light availability inside the foam cubes during photocatalytic inactivation of bacteria.

Figure 7:
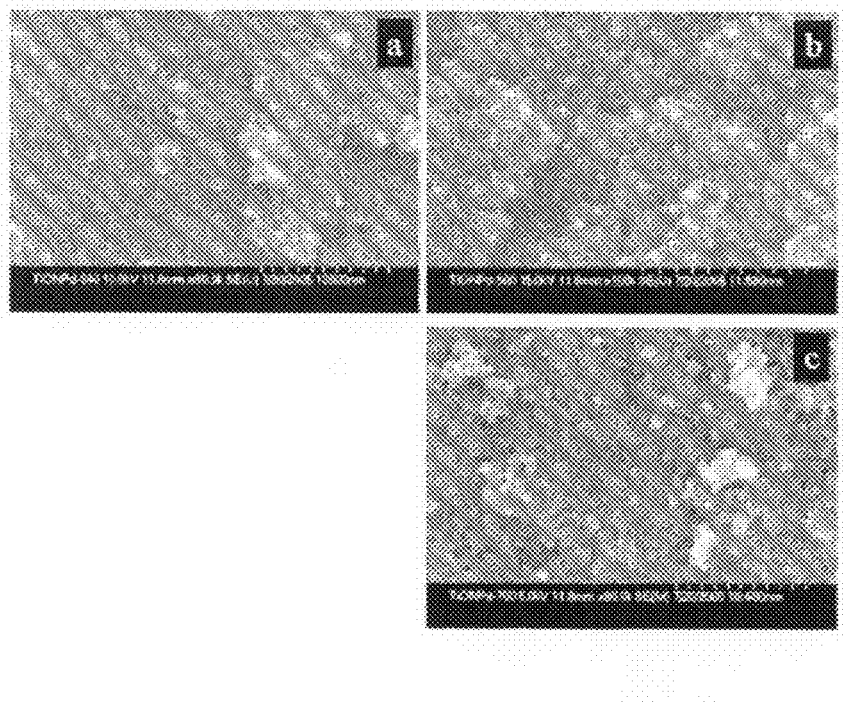
FIGS. 7 (a), (b) and (c) are SEM images showing the mesopores of the porous foams after calcination at (a) 340° C., (b) 500° C., and (c) 700° C.

The SEM images in FIG. 7 revealed better and better crystallinity of Pd doped TiON foam when the calcination temperature is increased. Obviously, crystalline grains grow larger at the higher calcination temperature as well. From these micrographs, mesopores among Pd doped TiON particles can be seen. Micro-(<2 nm) or meso-(2-20 nm) pores are characteristic of particles made from a sol-gel process. The duality of the foam porosity with both macropore and mesospore is ideal for high photocatalytic efficiency in flow-through operations.

Figure 8:
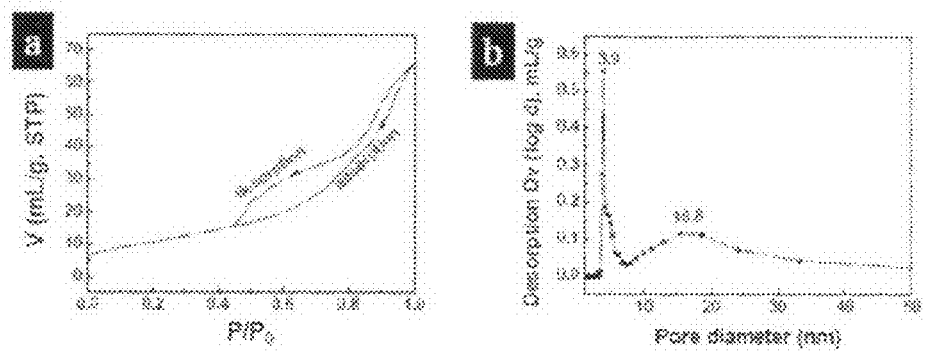
FIG. 8 (a) is the nitrogen adsorption-desorption isotherm of a Pd doped TiON foam.

The pore characteristics of the as-formed photocatalytic foams are shown in FIG. 8. Nitrogen adsorption-desorption measurement results in the isotherm in FIG. 8a, where a large hysteresis between adsorption and desorption is seen. The pore size distribution is given in FIG. 8b. It indicates that the main pore diameter is 3.9 nm, and a second peak diameter is 16.8 nm. Thus, the foam consists of large macropores with the diameter around 250 μm and of mesopores with a diameter below 20 nm. Macropores result in a low back pressure at high flow rates while mesopores provide large surface area.

Figure 9:
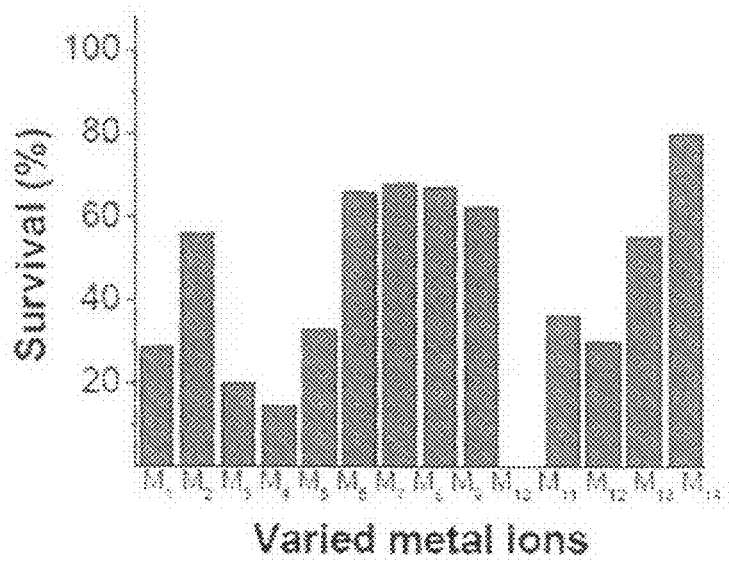
FIG. 9 is a graph of survival ratios of E. coli cells after photocatalytic treatment on various metal doped TiON foams. The metals are listed in Table 1.

Bactericidal data are presented as changes in the survival ratio, $N'/N_0$. $N_0$ and $N'$ are the number of colony-forming units per milliliter in the control and irradiation treatment, respectively. Control is the cell culture that runs through the foam and glass fiber stopper in the dark. The effect of photocatalysis on cell viability is introduced under visible-light irradiation, and the cell culture was let run for a sufficient 'stabilization time' before sample was collected for viability assay. This way, the factor of physical filtration was excluded. In FIG. 9, sterilization tests indicated that most of the co-doped $TiO_2$ foams have bactericidal effect under visible light illumination, which caused a decrease in bacteria colony forming unit compared to the control. Silver co-doped foam displays the fastest killing effect. On the contrary, the bactericidal function of NiO/TiON foam is less evident. An overall order of increasing efficiency for *E. coli* inactivation by metal doped TiON foams is observed as the follows: Ni<Mo~Nb~Mn~Co<Ce~W<Fe~Y<Pd~Cu<Pt<Nd<Ag. Although the common conditions for the synthesis and sterilization treatment were carefully controlled to reach a close similarity, this order shall not be held as highly accurate because of some unavoidable systematic errors. The metals known to have bactericidal effect, such as Ag, Pt, and Cu, normally exhibit higher inactivation rates, despite the very low loading amount of the metal.

Although the mechanisms of the enhancement from co-doping metal in N-doped $TiO_2$ and the subsequent order of improvement by different metals are not well understood at this time, many previous investigations on $M^{n+}/TiO_2$ may give hints to the answer (18, 19). Among the metals Gracia and colleagues studied in $M^{n+}$—$TiO_2$ thin films (Cr, V, Fe, Co), crystallization of the thin films upon annealing was affected by these ions (18). At T>573 K, $TiO_2$ crystallizes into the anatase or rutile structure depending on the type and amount of cations present in the film. The extent of partial segregation of the cation in the form of $M_2O_n$ is also associated with the type of cations. These factors may play roles in the metal doped TiON systems as well and contribute to the varying extent of enhanced photocatalytic efficiency. In a review article about transition metal ions in photocatalytic systems, Litter pointed to the fact that various factors can affect the photocatalytic reaction rates (19). For instance, the effect of metal on the rate and efficiency of photocatalytic reactions is strongly dependent on the type and concentration of the metal. Both an increase in the photoreaction rate and a detrimental effect have been observed, with an optimal value in concentration that enhances the rate of the photocatalytic transformation.

The increase in photooxidation rates by addition of metal ions has been attributed, in many cases, to the ability of the metal ions to scavenge electrons on the $TiO_2$ surface. The trappping of charge carriers can decrease the recombination rate of $e^-/h^+$ pairs and consequently increase the lifetime of charge carriers. This finally increases the production rate of •OH formation (19). The total number of free charge carriers on the $TiO_2$ surface is determined by the rate of charge pair generation, charge trapping, charge release and migration, charge recombination as well as the rate of interfacial charge transfer. The complexities of the role of metal dopants are that they can participate in all of these processes.

Figure 10:
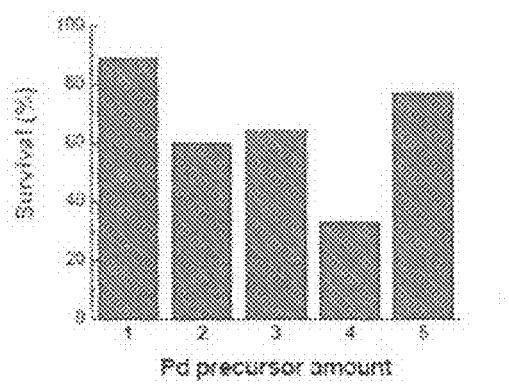
FIG. 10 is a graph of survival ratios of E. coli cells on Pd doped TiON foams with varying amounts of Pd precursor added and all calcined at 500° C.: (1) 0 mg; (2) 10 mg; (3) 20 mg; (4) 30 mg; and (5) 90 mg.

The bactericidal results in FIG. 10 revealed the impact of metal ion loading on the killing effect of Pd doped TiON foam. Among the four values of initial precursor amounts, 30 mg seemed to be optimal. Whatever the amount of Pd, the added Pd showed an enhancement in photocatalytic performance compared to TiON (0% Pd). However, when the concentration of Pd is too high, the foam has a loss in mechanical strength. The weak foam is not desirable in scale-up operations. The decreased enhancement effect of higher amount of Pd may also be associated with the phenomenon of PdO segregation, similar to what Gracia et al. observed in other metal doped materials.

Figure 11:
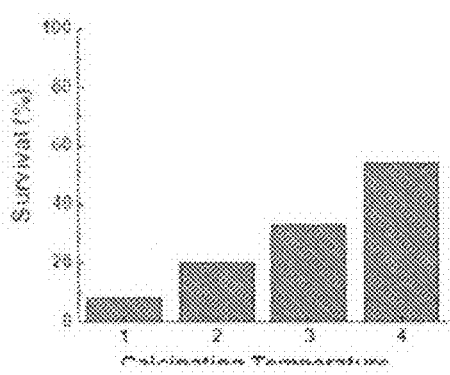
FIG. 11 is a graph of survival ratios of E. coli cells after photocatalytic treatment on Pd doped TiON foams calcined at: (1) 340° C.; (2) 400° C.; (3) 500° C.; and (4) 700° C.
Figure 12:
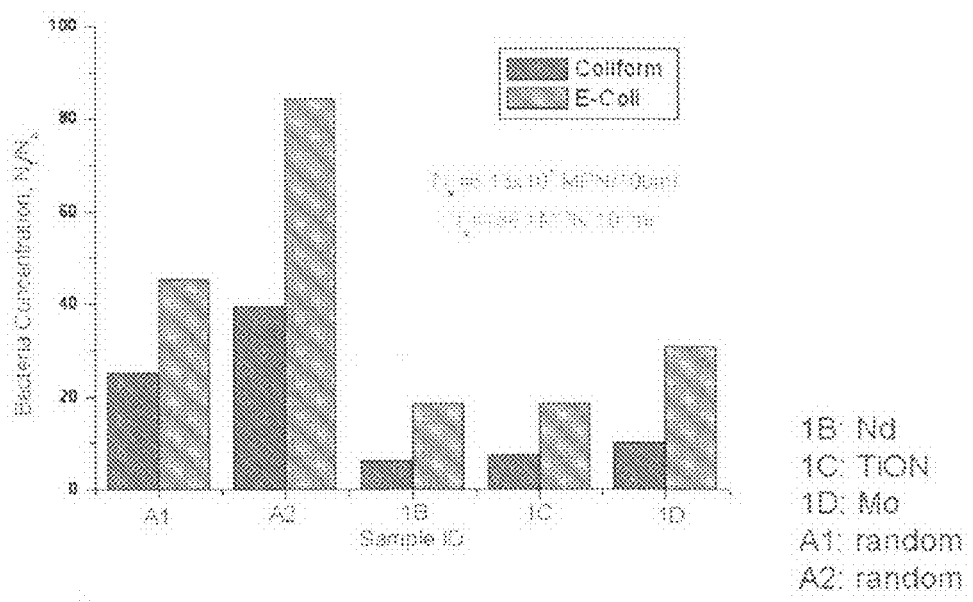
FIG. 12 is a graph illustrating the reduction of bacterial concentration in the secondary effluent from a wastewater treatment plant, after a single pass flow through a metal doped TiON reactor illuminated by visible light.

The bactericidal results in FIG. 11 revealed the effect of calcination temperature on the killing effect of Pd doped TiON foam. The order of increasing efficiency for $E.$ $coli$ inactivation goes like 700<500<400<340° C. This order may be affected by multiple factors including the concentration of N after calcination, the quality of crystallization under different calcination temperatures, and the grain size variation resulting from grain growth at higher calcination temperatures. The grain size can change the ultimate surface area. The results showed that the optimal amount of nitrogen concentration and larger surface area in the 340° C.-calcined sample overcomes its poor crystallization.

REFERENCES (1) Cheng, P.; Gu, M. Y.; Jin, Y. P. *Progress In Chemistry* 2005, 17, 8-14.
(2) Huang, W. Y.; Yu, Y. *Progress In Chemistry* 2005, 17, 242-247.
(3) Lin, L.; Lin, W.; Zhu, Y. X.; Zhao, B. Y.; Xie, Y. C. *Chemistry Letters* 2005, 34, 284-285.
(4) Ohno, T.; Akiyoshi, M.; Umebayashi, T.; Asai, K.; Mitsui, T.; Matsumura, M. *Applied Catalysis A-General* 2004, 265, 115-121.
(5) Reddy, E. P.; Sun, B.; Smirniotis, P. G. *Journal of Physical Chemistry B* 2004, 108, 17198-17205.
(6) Wu, P. G.; Ma, C. H.; Shang, J. K. *J. of Appl. Phys A* 2005, 81, 1411-1417.
(7) Yu, J. C.; Ho, W. K.; Yu, J. G.; Yip, H.; Wong, P. K.; Zhao, J. C. *Environmental Science & Technology* 2005, 39, 1175-1179.
(8) Sakatani, Y., Jun Nunoshige, Hiroyuki Ando, Kensen Okusako, Hironobu Koike, Tsuyoshi Takata, Junko N. Kondo, Michikazu Hara and Kazunari Domen *Chemistry Letters* 2003, 32, 1156-1157.
(9) Sakatani, Y.; Ando, H.; Okusako, K.; Koike, H.; Nunoshige, J.; Takata, T.; Kondo, J. N.; Hara, M.; Domen, K. *J. Mater. Res.* 2004, 19, 2100-2108.
(10) Wu, P. G., Xie; R. C., Shang, J. K. *Adv. Mater.* 2006, In Press.
(11) Li, L., Zhu, W., Zhang, P., Chen, Z., Han, W. *Water Res.* 2003, 37, 3646-3651.
(12) Rampaul, A., Parkin, I., O'Neill, S., Desouza, J., Mills, A., Elliott, N. *Polyhedron* 2003, 22, 35-44.
(13) Langlet, M., Kim, A., Audier, M. *J. Sol-Gel Sci. Tech.* 2002, 25, 223-234.
(14) Belhacova, L.; Krysa, J.; Geryk, J.; Jirkovsky, *J. Journal Of Chemical Technology And Biotechnology* 1999, 74, 149-154.
(15) Yu, M. J.; Kim, B. W. *Journal Of Microbiology And Biotechnology* 2004, 14, 1105-1113.
(16) Choi, Y. S.; Kim, B. W. *Journal of Chemical Technology and Biotechnology* 2000, 75, 1145-1150.
(17) Shchukin, D. G.; Ustinovich, E. A.; Kulak, A. I.; Sviridov, D. V. *Photochemical & Photobiological Sciences* 2004, 3, 157-159.
(18) Gracia, F.; Holgado, J. P.; Caballero, A.; Gonzalez-Elipe, A. R. *Journal of Physical Chemistry B* 2004, 108, 17466-17476.
(19) Litter, M. I. *Applied Catalysis B: Environmental* 1999, 23, 89-114.
(20) Sunada, K.; Watanabe, T.; Hashimoto, K. *Environmental Science & Technology* 2003, 37, 4785-4789.
(21) Tatsuma, T.; Takeda, S.; Saitoh, S.; Ohko, Y.; Fujishima, A. *Electrochemistry Communications* 2003, 5, 793-796.
(22) Fuerte, A.; Hernandez-Alonso, M. D.; Maira, A. J.; Martinez-Arias, A.; Fernández-Garcia, M.; Conesa, J. C.; Soria, *J. Chem. Commun.* 2001, 2718-2719.
(23) Selcuk, H.; Zaltner, W.; Sene, J. J.; Bekbolet, M.; Anderson, M. A. *Journal Of Applied Electrochemistry* 2004, 34, 653-658.
(24) Matsunaga, T., Tomoda, T. R., Nakajima, T., Wake, H, *FEMS Microbiol Lett* 1985, 29, 211-214.
(25) Li, W.; Wang, Y.; Lin, H.; Shah, S. I.; Huang, C. P.; Doren, D. J.; Rykov, S. A.; Chen, J. G.; Barteau, M. A. *Applied Physics Letters* 2003, 83, 4143-4145.
(26) Yan, X.; He, J.; Evans, D.; Duan, X.; Zhu, Y. *Appl. Catalysis B* 2005, 55, 243-252.
(27) Iwasaki, M.; Hara, M.; Kawada, H.; Tada, H.; Ito, S. *J. Colloid & Interface Sci.* 2000, 224, 202-204.
(28) Ruiz, A.; Dezanneau, G.; Arbiol, J.; Comet, A.; Morante, J. R. *Thin Solid Films* 2003, 436, 90-94.
(29) Sokmen, M.; Candan, F.; Sumer, Z. *Journal Of Photochemistry And Photobiology A-Chemistry* 2001, 143, 241-244.
(30) Belver, C.; Lopez-Munoz, M. J.; Coronado, J. M.; Soria, *J. Appl. Catalysis B* 2003, 46, 497-509.
(31) Xie, at al. patent application Publication, Publication No. US 2007/0202334 A1 (Aug. 30, 2007).
(32) Xie, et al. patent application Publication, Publication No. US 2007/0190765 A1 (Aug. 16, 2007).
(33) Wu, Pinggui, Antimicrobial Materials for Water Disinfection Based on Visible-Light Photocatalysis, Ph.D. thesis, May 2007, University of Illinois at Urbana-Champaign.

What is claimed is:

1. A quaternary oxide foam, comprising an open-cell foam comprising titanium oxide containing:
    (a) a dopant metal comprising palladium,
    (b) a dopant nonmetal,
    (c) titanium, and
    (d) oxygen,
    wherein the dopant metal is present at a concentration of at most 2 wt. %, and wherein the open-cell foam comprises a pore size distribution having at least two peaks.

2. The quaternary oxide foam of claim 1, wherein the atomic ratio of titanium, oxygen and dopant nonmetal is 1:0.5-1.99:0.01-1.5.

3. The quaternary oxide foam of claim 1, wherein the atomic ratio of titanium, oxygen and dopant nonmetal is 1:1.9-1.99:0.01-0.1.

4. The quaternary oxide foam of claim 1, wherein the dopant nonmetal is nitrogen.

5. The quaternary oxide foam of claim 4, wherein the foam has a porosity of at least 90%.

6. The quaternary oxide foam of claim 4, wherein the foam has a porosity of 90-98%.

7. The quaternary oxide foam of claim 4, wherein the foam is monolithic with a longest dimension of at least 0.1 mm.

8. The quaternary oxide foam of claim 4, wherein the foam is monolithic with a longest dimension of at least 0.5 mm.

9. The quaternary oxide foam of claim 4, wherein the foam is monolithic with a longest dimension at least 1 mm.

10. The quaternary oxide foam of claim 4, wherein visible light will lose less than 75% of its intensity when passed through 1 cm of the foam.

11. The quaternary oxide foam of claim 4, wherein visible light will lose less than 50% of its intensity when passed through 1 cm of the foam.

12. A method of catalyzing a reaction, comprising:
exposing a quaternary oxide foam to light; and
contacting the quaternary oxide foam with a reactant, to form a product of the reaction;
wherein the quaternary oxide foam comprises an open-cell foam comprising titanium oxide containing:
(a) a dopant metal comprising palladium,
(b) a dopant nonmetal,
(c) titanium, and
(d) oxygen,
wherein the dopant metal is present at a concentration of at most 2 wt. %, and wherein the open-cell foam comprises a pore size distribution having at least two peaks.

13. A reactor, comprising:
(i) an inlet,
(ii) an outlet, and
(iii) a catalyst, fluidly connected to the inlet and the outlet,
wherein the catalyst comprises a quaternary oxide foam comprising an open-cell foam comprising titanium oxide containing:
(a) a dopant metal comprising palladium,
(b) a dopant nonmetal,
(c) titanium, and
(d) oxygen,
wherein the dopant metal is present at a concentration of at most 2 wt. %, and wherein the open-cell foam comprises a pore size distribution having at least two peaks.

14. A quaternary oxide foam, prepared by a method comprising:
impregnating an open-cell template foam with a liquid mixture; and
heating the impregnated open-cell foam, to form the quaternary oxide foam comprising titanium dioxide including a dopant metal and a dopant nonmetal;
wherein the liquid mixture contains
(a) the dopant metal comprising palladium,
(b) the dopant nonmetal, and
(c) titanium,
wherein the dopant metal is present in the quaternary oxide foam at a concentration of at most 2 wt. %, and wherein the open-cell foam comprises a pore size distribution having at least two peaks.

* * * * *